T. O. ORGAN.
AXLE LUBRICATOR.
APPLICATION FILED MAY 26, 1916.

1,225,483.

Patented May 8, 1917.

WITNESSES

INVENTOR
Thomas O. Organ
BY
ATTORNEYS

UNITED STATES PATENT OFFICE.

THOMAS OPIE ORGAN, OF PHILADELPHIA, PENNSYLVANIA.

AXLE-LUBRICATOR.

1,225,483.

Specification of Letters Patent.

Patented May 8, 1917.

Application filed May 26, 1916. Serial No. 99,957.

*To all whom it may concern:*

Be it known that I, THOMAS O. ORGAN, a citizen of the United States, and a resident of Philadelphia, in the county of Philadelphia and State of Pennsylvania, have invented a new and Improved Axle-Lubricator, of which the following is a full, clear, and exact description.

My invention, while capable of application generally to running wheels and their axles, is more particularly intended for embodiment in car wheels.

The invention relates to a means whereby to lubricate running wheels turning on a stationary axle and having a reservoir for the lubricant surrounding the hub and bore of the wheel. It is well known with the lubricant placed in an annular reservoir or cavity surrounding the hub of the wheel that it is carried, when the wheel is in motion, by centrifugal force, away from the center. The centrifugal force, overcoming gravitation, causes the lubricant to remain on the outer wall of the reservoir, thereby depriving the axle of the lubricant when the wheel is in motion. When the wheel stops, the lubricant finds its way from the reservoir through ports or the like in the hub to the axle, so that dependence is placed on the durability or wearing quality of the lubricant to lubricate the axle while the wheel is in motion, and this is insufficient when any considerable distance is traveled.

The prime object of the invention is to provide a means for conducting the lubricant from the outer wall of the reservoir, when the wheel is in motion, to the axle. The stated object of the invention is attained by a pendulous lubricating device in the form of a ring having a bore to permit the axle to pass freely therethrough so that the ring rests on the crown of the axle. The lower end of the ring is weighted to maintain the ring in vertical position while at the top of the ring, is an arm that extends adjacent to the top of the reservoir in position to detach the lubricant therefrom, so that the detached and collected lubricant will be freed from the influence of centrifugal force and will gravitate on said arm to the axle.

The invention will be particularly explained in the specific description following.

Reference is to be had to the accompanying drawings forming a part of this specification in which similar reference characters indicate corresponding parts in all the views.

Figure 1:
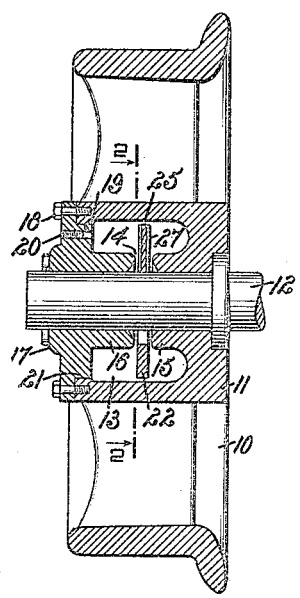
Figure 1 is a vertical section of a car wheel equipped with my invention, a portion of the car axle being shown in side view.

In the illustrated example of my invention, which is the preferred embodiment thereof, the car wheel 10 has a hub 11 receiving the car axle 12. Said hub is formed with an annular reservoir 13 to contain the lubricant and with an annular slot 14 extending radially from the bore of the hub to the reservoir 13, and being contracted adjacent to the reservoir while flaring inwardly to accommodate the lubricant directed thereto by the collecting device hereinafter described.

The slot 14 is produced in practice by forming a longitudinally projecting boss or hub member 15 in fixed relation with one side of the wheel, and an opposed boss or hub member 16 formed on the inner side of a cap 17, which is removably secured by bolts 18. In the cap 17 is a charging bore or oil hole 19 closed by any suitable means such as a screw plug 20. The cap 17 is rabbeted annularly in the inner face as at 21 to snugly fit within the adjacent end of the hub and strengthen said end.

In the hub 11, I provide a pendulous lubricating element 22 having a bore 23 larger than the bore of the hub to freely receive the axle 12 and to be sustained thereon by resting on the crown or upper side of the axle. The lower end of the ring 22 is weighted as at 24 to maintain the ring upright and disposed in the slot 14. At the upper side of the ring, the same is formed with an upstanding arm 25, which extends to a height to lie adjacent to the wall of the reservoir 13 at the top. At each side of the arm 25, scraper members 26 are formed and in the faces of said arm oil-conducting grooves 27 are formed, extending from the upper end to the bore 23.

Figure 2:
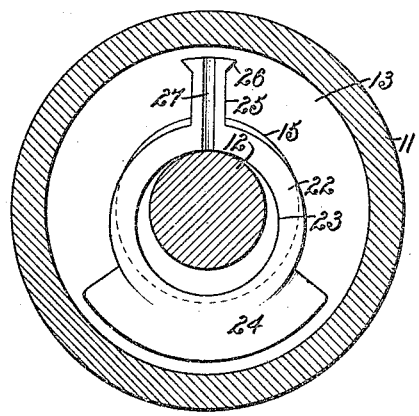
Fig. 2 is a cross section on the line 2—2, Fig. 1.

As clearly shown in Fig. 2, the pendent weight 24 is of arcuate form and is radially outward from the body of the ring 22. It is to be noted, furthermore, that the ends of the arcuate weight are tapered, the purpose of which is to offer the minimum resistance to the grease as the latter is carried around by the revolving wheel.

In use, the turning of the car wheel about the axle 12 will result in the centrifugal force throwing the oil in the form of a film against the outer wall of the reservoir 13, and as the lubricant is caused to rotate with the wheel, the scraper members 26 will detach a portion of the lubricant, thereby removing it from the influence of centrifugal force and permitting the detached lubricant to gravitate to the axle. Thus, instead of the lubricant being maintained by centrifugal force away from the axle, it will be effectively conducted to the axle, the centrifugal force being utilized to carry the oil to the oil-detaching and conducting arm 25 of the pendulous ring, so that during the rotation of the wheel, the axle and the bore of the hub will be effectively lubricated.

Running wheels to which my invention relates, it is to be understood, are distinguished from loose pulleys. It is to be observed also, that the reservoir in my invention is formed in and by the hub of the wheel, and that the outer wall of the reservoir is not formed by the wheel rim as in a pulley.

Having thus described my invention I claim as new and desire to secure by Letters Patent:

1. A wheel having an annular reservoir to contain a lubricant, a removable cap on the hub at one side, said cap and the opposite fixed side of the wheel having opposed bosses spaced to form an annular slot extending from the bore of the hub to the said reservoir, the said slot being flared inwardly, producing an enlarged annular chamber adjacent to the bore of the hub, and a pendulous ring accommodated in the annular slot and weighted at the lower end to prevent its turning, said ring having a bore to freely receive an axle, the ring at the top having an upwardly extending member terminating at the top of the reservoir to detach lubricant therefrom and permit it to gravitate to the bore of the ring.

2. In a wheel having a reservoir for receiving lubricant, and an axial bearing communicating with the reservoir by an annular slot; a pendulous lubricating device having a ring-like body formed with a bore to fit loosely on an axle and having a pendent weight in fixed relation to said body and radially outward therefrom, the ends of the said weight being tapered to offer the minimum resistance to the lubricant, said body having an upwardly projecting arm thereon at the top and extending adjacent to the top of the reservoir to collect the lubricant.

3. In a wheel having a reservoir for receiving a lubricant and formed with an axial bearing communicating with said reservoir through the medium of an annular slot; a lubricating device comprising a body in the form of a ring, having a bore to fit loosely on an axle, an arm rising from the ring at the top and terminating adjacent to the top of the reservoir to collect the lubricant from the latter as the wheel revolves, and an integral arcuate weight on the ring at the bottom and radially outward from said body, the ends of said arcuate weight being tapered to offer the minimum resistance to the lubricant.

THOMAS OPIE ORGAN.

Copies of this patent may be obtained for five cents each, by addressing the "Commissioner of Patents, Washington, D. C."